United States Patent [19]
Lichtin et al.

[11] Patent Number: 4,980,040
[45] Date of Patent: Dec. 25, 1990

[54] PHOTOPROMOTED METHOD FOR DECOMPOSING OXIDES OF NITROGEN INTO ENVIRONMENTALLY COMPATIBLE PRODUCTS

[75] Inventors: Norman N. Lichtin, Newton Center; Kallambella M. Vijayakumar; Junchang Dong, both of Brookline, all of Mass.

[73] Assignee: Trustees of Boston University, Boston, Mass.

[21] Appl. No.: 371,172

[22] Filed: Jun. 26, 1989

[51] Int. Cl.$^5$ ................................................. B01J 1/10
[52] U.S. Cl. .............................. 204/157.46; 204/157.5
[58] Field of Search ........................... 204/157.46, 157.5

[56] References Cited
U.S. PATENT DOCUMENTS

| | | | |
|---|---|---|---|
| 2,832,665 | 4/1958 | Hertzberg et al. | 204/157.46 |
| 3,378,475 | 4/1968 | Morse | 204/157.46 |
| 4,004,995 | 1/1977 | Machi et al. | 204/157.46 |
| 4,076,606 | 2/1978 | Suzuki et al. | 204/157.46 |
| 4,146,450 | 3/1979 | Araki et al. | 204/157.46 |

FOREIGN PATENT DOCUMENTS 2549459  1/1985  France ............................ 204/157.46

OTHER PUBLICATIONS

Michell J. Sienko et al., *Chemistry*, Second Edition McGraw-Hill Book Co., Inc., (1961), pp. 247-249.

*Primary Examiner*—Wayne A. Langel
*Attorney, Agent, or Firm*—David Prashker

[57] ABSTRACT

A method is provided for the photopromoted solid-catalyzed decomposition of oxides of nitrogen such as nitric oxide which are major pollutants of air and the environment at large. By this method, oxides of nitrogen are decomposed into molecular nitrogen and molecular oxygen by reactive passage over a solid metal oxide catalyst at an elevated temperature under irradiation at wavelengths absorbable by the catalyst. In this manner, the major oxides of nitrogen pollutants originating in the exhaust gases produced by automobile engines, jet engines used in the propulsion of aircraft, gas-turbine power generators, and the combustion of fossil fuels generally are controlled and eliminated.

12 Claims, 2 Drawing Sheets

PHOTOPROMOTED METHOD FOR DECOMPOSING OXIDES OF NITROGEN INTO ENVIRONMENTALLY COMPATIBLE PRODUCTS

FIELD OF THE INVENTION

The present invention is concerned with processes for the control of nitrogen-containing pollutants in the air; and is particularly directed to methods for photopromoted solid-catalyzed decomposition of oxides of nitrogen present within gaseous streams originating from exhaust gases produced by combustion of fossil fuels and ordinarily released into the environment at large.

BACKGROUND OF THE INVENTION

Within our highly technological and industrial world, the oxides of nitrogen have become recognized as major pollutants of the air and the environment. Perhaps the best known of these pollutants are the $NO_x$ compounds such as nitric oxide (NO) and nitrogen dioxide ($NO_2$) which originate in the exhaust gases produced by the combustion of fossil fuels in automobile engines, jet engines used in propulsion of aircraft, gas-turbine power generators, and steam power-plants and space-heating systems based on the burning of natural gas, petroleum products, and other fossil fuels. Nitric oxide is a known precursor of ozone; and in combination with ozone and hydrocarbon vapors leads to photochemical smog, a health and ecological hazard. Nitrogen dioxide is a precursor of acid rain [Calvert, S. and H.M. England, *Handbook Of Air Pollution Technology*, John Wiley & Sons, Inc., N.Y., 1984, pp 71-81].

The decomposition of both NO and $NO_2$ into molecular oxygen and molecular nitrogen is thermodynamically spontaneous at 25° C. [$\Delta G° = -20.72$ and $-12.39$ kcal/mole for NO and $NO_2$ respectively] but uncatalyzed gas-phase decomposition does not proceed at a significant rate at this temperature. Rather, the position of equilibrium among NO, $NO_2$, $N_2$, and $O_2$ shifts towards NO with increasing temperature above 1,000° C. as the rate of equilibration in the gas-phase becomes ever faster. Thus, NO is a reaction by-product of many high-temperature reactions generally; and is a specific by-product of the high-temperature combustion of natural gas and other organic fuels even when such fuels do not contain chemically bound nitrogen Subsequently, the partial oxidation of NO into $NO_2$ occurs typically when NO-containing effluent gas from combustion is mixed with air thereby producing a mixture of oxides of nitrogen commonly designated as $NO_x$ wherein x is a positive number It is noteworthy that in spite of extensive research, no practically effective catalyst or catalytic reaction at ordinary or elevated temperatures for the decomposition of NO into molecular nitrogen and oxygen has been reported [Harrison et al., "Catalysis Of Reactions Involving The Reduction Or Decomposition Of Nitrogen Oxides", in *Catalysis, Volume 5*, (G.C. Bond and G.W. webb, editors) The Royal Society Of Chemistry, London, 1982, pages 127-171; Mobley, J.D. and K.J. Lim, "Control Of Gases By Chemical Reaction," and E. DeKiep and D.J. Patterson, "Emission Control In Internal Combustion Engines," in *Handbook Of Air pollution Technology*, John Wiley and Sons, Inc., N.Y., 1984, pages 203-213 and 489-512, and the references cited therein]. Instead, present technology controls $NO_x$ and oxides of nitrogen in general, not by decomposition, but rather by reducing these pollutants to molecular nitrogen. This is accomplished in several ways: control of emissions from stationary sources accomplishes $NO_x$ reduction using $NH_x$ as in the non-catalytic "$DeNO_x$" process developed by Exxon Corporation for treatment of stack gases [U.S. Pat. No. 3,900,554]; or in analogous catalytic processes using $NH_3$ and a catalyst such as $V_2O_5$ [Mobley and Lim, op. cit., pp 206-209]. In contract, the removal of $NO_x$ from the exhaust gases stemming from internal combustion engines is accomplished by reducing the exhaust to $N_2$ using CO and/or unburned hydrocarbon catalyzed by rhodium DeKiep and patterson, supra]. In addition, a recent report describes the use of cyanuric acid, $(HOCN)_3$, to reduce NO into $N_2$ with concomitant production of carbon monoxide as a practical means of treating diesel exhaust [Perry, R.A. and D.L. Siebers, Nature 324:657-658 (1986)].

A variety of problems, however, exists: while large scale industrial processes use $NH_3$ to reduce oxides of nitrogen, one recognizes that the use of $NH_3$ as a reactant involves the major risk of substituting one hazardous pollutant ($NH_3$) for another ($NO_x$). Moreover, both rhodium and platinum used currently in automotive antipollution units are not only very expensive but must be obtained from the Soviet Union or from South Africa, sources which cannot be regarded today as entirely reliable Similarly, the use of cyanuric acid merely substitutes CO in place of NO in the effluent gas and requires periodic replenishment of that reagent.

In comparison, a large part of the present knowledge of catalysts useful in decomposition originates from the work of Winter on thermal catalytic decomposition of NO using metal oxides [E.R.S. Winter, *J. Catal.* 22:158-170 (1971); E.R.S. Winter, *J. Catal.* 34:44-444 (1974)]. The reported results describe a variety of metal oxides which are promising because they display thermal catalytic activity at temperatures ranging from 33°-870° C. The activity of these metal oxides, however, was solely as thermal catalysts using a thermal decomposition reaction.

Overall, therefore, there is a clear and generally recognized need for processes and a technology which is able to decompose $NO_x$ compounds and oxides of nitrogen generally into environmentally compatible products using catalytic methods which do not suffer from the drawbacks and hazards associated with conventionally known techniques and industrial processes. The development of a photopromoted, solid-catalyzed method for decomposition of nitric oxide and other oxides of nitrogen would therefore be recognized as a major improvement and long sought for advance in controlling pollutants originating by the combustion of fossil fuels.

SUMMARY OF THE INVENTION

A photopromoted method for decomposing oxides of nitrogen into environmentally compatible products is provided, this method comprising the steps of:

obtaining at least one solid metal oxide catalyst capable of absorbing photoenergy at a predeterminable wavelength;

introducing a gaseous stream comprising at least one oxide of nitrogen to the solid metal oxide catalyst to form a reaction mixture;

heating the reaction mixture to an elevated temperature substantially between 100°-700° C.; and adding photoenergy at a wavelength absorbable by the heated solid metal oxide catalyst of the heated reaction mixture wherein the absorption of the photoenergy causes the heated metal oxide catalyst to enter into an activated catalytic state and the oxide of nitrogen is decomposed by the activated catalytic state into molecules of nitrogen and oxygen.

DETAILED DESCRIPTION OF THE FIGURES

The present invention may be more easily and completely understood when taken in conjunction with the accompanying drawing, in which.

DETAILED DESCRIPTION OF THE PREFERRED EMBODIMENTS

Figure 1:
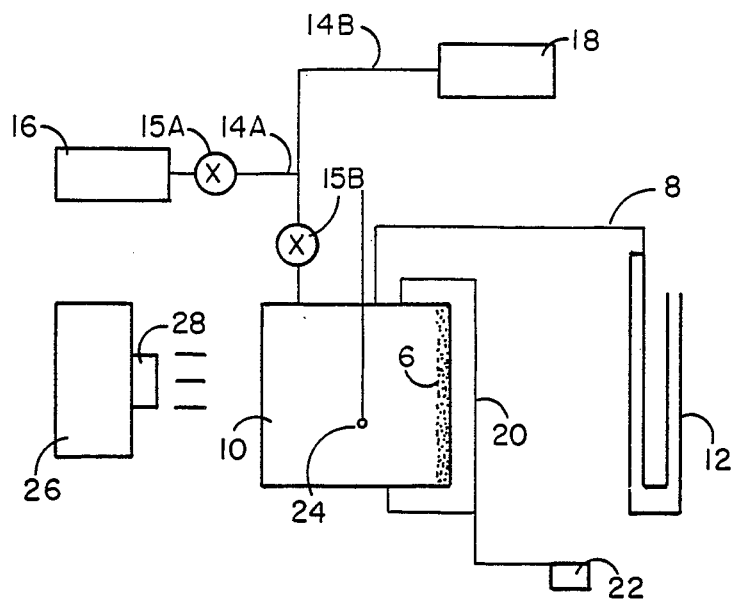
FIG. 1 is a block diagram of an apparatus useful for practicing the methods of the present invention.

The invention is a method for the control of oxides of nitrogen generally and $NO_x$ compounds in particular wherein x is a positive number, all of which are recognized as major pollutants of air and the ambient environment generally. The unique methodology is based and relies upon the photopromoted solid-catalyzed decomposition of nitric oxide (NO), preferably present in a gaseous stream. Nitric oxide typically originates in the exhaust gases produced by such sources as automobile engines, jet engines, gas-turbine power generators, and the combustion of fossil fuels generally. Using this novel process, such NO is decomposed into $N_2$ and $O_2$ by passage over a solid metal oxide catalyst at an elevated temperature substantially between 100°–700° C., and preferably between 200°–400° C., which is under irradiation at wavelengths absorbable by the catalyst. This is summarized by Reaction I as follows:

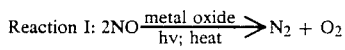

Reaction I: $2NO \xrightarrow[hv; \; heat]{metal \; oxide} N_2 + O_2$

Clearly, the catalytic Reaction I relies and depends upon the presence of nitric oxide in a gaseous stream as the requisite raw material in order that the catalytic decomposition proceed. The present invention, however, is not limited merely to the decomposition of nitric oxide (NO) alone. To the contrary, the present methodology is useful with gaseous streams containing $N_2O$, $N_2O_3$, and $N_2O_4$ as well as with gases containing $NO_x$ compounds (wherein x is a positive number) uniformly. Various oxides of nitrogen are typically decomposed under a variety of different conditions and circumstances into nitric oxide and/or other products as illustrated by the reactions within Table I. Accordingly, recognizing that by Reaction I, that the process may be conducted at elevated temperatures ranging substantially between 100°–700° C.; and recognizing further that the gaseous stream containing oxides of nitrogen of varying composition and structure will, in the main, degrade under these circumstances into nitric oxide (NO) or directly into $N_2$ and $O_2$ almost spontaneously, it is clearly evident that the present invention will accomplish the catalytic decomposition of oxides of nitrogen categorically. The general degradation then is achieved by first degrading the other oxides of nitrogen ($N_2O_3$, $N_2O_4$, etc.) individually into NO; and then decomposing the resulting NO using the catalytic method of Reaction I. In this manner, the present invention is deemed suitable for the decomposition of all oxides of nitrogen generally as well as for the catalytic decomposition of $NO_x$ and NO specifically.

TABLE I

| DISSOCIATION REACTION | CONDITIONS |
|---|---|
| (a) $N_2O \rightarrow N_2 + 1/2O_2$ | Begins at about 100° C. over solid catalysts |
| (b) $N_2O_3 \rightarrow NO + NO_2$ | Begins at about −30° C. |
| (c) $2NO_2 \rightarrow 2NO + O_2$ | Begins at about 30° C. |

(a) Dell et al., Trans. Far. Soc. 49:201 (1953).
(b) Cotton, F. A. and G. Wilkinson, Advanced Inorganic Chemistry, John Wiley & Sons, Inc., 5th ed., New York, 1988, p 323.
(c) Ibid, p 324.

The decomposition methodology comprising the present invention may be performed in any appropriate apparatus or housing able to provide a controlled gaseous stream and the introduction of photoenergy at determinable wavelengths. For research purposes, the housing can take physical form as a pyrex glass reactor. Alternatively, specially designed reaction chamber units designed for retrofit into existing systems for the combustion of fossil fuels (including jet engines and gas turbines) operating at elevated temperatures would also serve as the appropriate apparatus. Such specially designed reaction chamber units would provide effluent gases from fossil fuel combustion as the gaseous stream which would then be exposed to a suitable metal oxide catalyst under artificial irradiation at wavelengths absorbed by the catalyst. It is expected that fiber optics would be used to transmit the radiation from source lamps to the immediate vicinity of the catalyst and the effluent gases within the reactor chamber unit. Moreover, the prepared reaction mixture need not be pure in content; under normal use conditions, it is expected that a variety of other gases and vapor such as water vapor, dinitrogen, dioxygen, methane, carbon monoxide, carbon dioxide, unburned or partially oxidized hydrocarbons, and soot or other particullate matter may be present. None of these incidental compositions or additives will prevent the catalytic decomposition defined by Reaction I.

Similarly, as used herein, photoenergy is defined as electromagnetic radiation of any wavelength. The specific means by which photoenergy is introduced into the reaction chamber or to a prepared reaction mixture is deemed to be a matter of convenience or personal choice. Accordingly, the decision to employ lamps or fiber optics or any other physical means for generating or transmitting photoenergy from its source to the metal oxide catalyst lies solely with the user and the intended application.

Reaction I as given above demands only that at least one oxide of nitrogen, preferably NO, be combined with at least one solid metal oxide catalyst capable of absorbing photoenergy at a predetermined wavelength; that these reactants be heated to an elevated temperature substantially between 100°–700° C., and preferably between 200°–400° C., and photoenergy at a wavelength absorbable by the heated solid metal oxide catalyst of the reaction mixture be added such that the catalyst enters an activated catalytic state. The reaction may therefore be conducted continuously over 24 hour periods, intermittently, or at any desired time interval suitable for use within the intended application Moreover, any source of photoenergy may be employed so long as the wavelength of photoenergy is absorbable by the solid metal oxide catalyst within the reaction mixture. The essential requirement and condition is: when the metal oxide catalyst and the gaseous stream containing oxides of nitrogen are combined and heated to an appropriate elevated temperature, that the addition of photoenergy cause an activated catalytic state within the metal oxide and that this activated catalytic state directly cause the decomposition into molecules of nitrogen and oxygen.

The reaction system variables therefore include: the allowed time for catalytic reaction; the wavelengths of incident photoenergy introduced; the precise elevated temperature employed; the amount, physical state, and chemical composition of metal oxide catalysts employed; the physical deployment of the catalyst; the nature and amounts of other substances present in the gaseous stream; and the flow rate of the gaseous stream comprising at least one oxide of nitrogen. Some of the preferred parameters and factors are those which have been empirically determined as will be described in detail hereinafter. Nevertheless, operative and useful catalytic reactions may be obtained using a wide variety and disparity of factors. All of these variables are deemed to be matters of choice and may be selected to meet the user's individual requirements for convenience.

A number of different solid metal oxide compositions in diverse physical forms are believed to be useful as photopromoted catalysts within the method of the present invention. All of these catalysts are conventionally known and many are commercially available. Those solid metal oxides expected to be useful and catalytically active at the relatively low temperatures employed herein include: titanium oxides such as $TiO_2$; iron oxides such as $Fe_2O_3$; nickel oxides such as $NiO$; rhodium oxides such as $Rh_2O_3$; iridium oxides such as $IrO_2$; gadolinium oxides such as $Gd_2O_3$; copper-nickel oxides; and y-Be-Cu oxides alone or in platinized form. Methods for the preparation and preconditioning of these solid metal oxide catalysts are commonly known.

It is noteworthy that the decomposition method defined by Reaction I is both operative and catalytically effective in the absence of water vapor and in the absence of molecular oxygen within the gaseous stream comprising the oxide of nitrogen which is introduced into the reactor apparatus for catalytic decomposition. This absence of both water and molecular oxygen as initial reactants is documented and verified by the empirical experiments and data described hereinafter. Similarly, should water or water vapor and/or molecular oxygen be present as incidental compositions within the gaseous stream, these do not meaningfully affect or alter the decomposition defined by Reaction I. Moreover, because one major application for this methodology is that the effluent gases from the combustion of fossil fuels be a source of the oxides of nitrogen to be catalytically decomposed, a variety of different organic compositions and combustion by-products are expected to be present within the gaseous stream. The presence or absence of any of these incidental combustion by-products neither adds to nor detracts from the catalytic decomposition which is the present invention To empirically document and better describe the preferred embodiments, parameters, and intended applications of the catalytic method for decomposing oxides of nitrogen, a series of experiments was conducted. In each instance, the experiment utilized physical apparatus and reactants prepared in the following manner.

EXPERIMENTAL MODEL AND DESIGN

Reaction Apparatus

All the decomposition experiments were carried out using physical apparatus such as is illustrated by FIG. 1. A static pyrex glass photoreactor 10 with a film of catalyst 6 was connected via a line 8 to a U-shaped mercury manometer 12 which served as a pressure indicator. The photoreactor 10 was directly connected via tubing 14a to valve 15a to a tank of NO gas 16 and by tubing 14b and valve 15b to a rotary vacuum pump 18. The temperature of the photoreactor 10 was controlled and maintained by a heater 20 electrically joined to a variable voltage regulator 22. The internal temperature of the photoreactor 10 was measured by an immersion thermometer 24. Photoenergy, unless otherwise identified, was supplied by a 150 watt quartz-halogen lamp 26 equipped With a condensing assembly 28. Unless otherwise stated, the light source 26 was kept at a distance of 36 cm from the photoreactor. The other operating parameters were intentionally varied to provide empirical data under diverse reaction conditions.

Reactant Preparation

In the experimental series which follows, the unique catalytic process was carried out in the closed system described by FIG. 1 in which a 250 milliliter flask served as the thermostatically controlled pyrex glass photoreactor 10 and contained a film of solid metal oxide catalyst particles 6 which have been deposited from suspension within its interior volume. The catalyst was prepared and utilized as follows: 2.0 grams of chosen catalyst was added to 3.0 ml of methanol and ultrasonically mixed to provide a suspension. The suspension was then poured into the interior of the reaction flask and the interior walls of the flask coated by gently tilting the vessel. The coating was then vacuum dried using the vacuum system as described. The area of the dispersed catalytic coating upon the inner walls of the 250 ml reaction flask was found to be 38.5 cm² consistently. The evaporated catalyst coating was then purged with argon for 20 minutes duration before use each and every time.

In addition, 5.0 grams of calcium oxide were added to the bottom of the coated flask in order to absorb any nitrogen dioxide which might be present initially or as a final reaction product. Experimentation demonstrated that the absorption of nitrogen dioxide on calcium oxide powder is at least $10^4$ times faster than the catalytic decomposition of nitric oxide under these reaction conditions. It was found that the overall reaction is actually decomposition controlled and that the system pressure changes reflect the extent of the decomposition of NO or other oxides of nitrogen.

The reactions occurring over the catalyst surface and the CaO may be stated as follows:

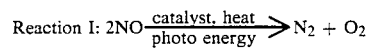

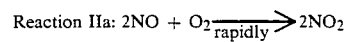

-continued

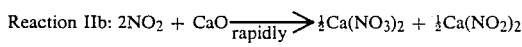

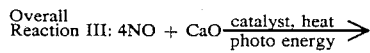

$$N_2 + \tfrac{1}{2}Ca(NO_3)_2 + \tfrac{1}{2}Ca(NO_2)_2$$

Clearly, the oxygen released by nitric oxide decomposition (Reaction I) reacts with the NO to yield $NO_2$ (Reaction IIa), which in turn is absorbed quantitatively by the calcium oxide (Reaction IIb). The overall result given by Reaction III causes an observable pressure change within the reactor which can be monitored continuously as a function of time. Calcium oxide (CaO) was then used as an absorber of the formed nitrogen dioxide ($NO_2$) and the resulting pressure changes allow this reaction to be used to measure the consumption of NO within the reactor.

To achieve this monitoring effect, 5.0 grams of calcium oxide was placed inside the photoreactor. Neither calcium oxide nor any products of its reaction (Reaction IIb) exerted any appreciable partial pressures within the range of study. The internal pressure could be monitored with a precision of $\pm 0.5$ mm Hg and the internal temperature of the reactor could be controlled within $\pm 1.5°$ C. The pressure was corrected for temperature variation using the ideal gas law and NO conversion obtained at any time by the relation:

$$\Delta P_{NO} = 4/3[P_O - P_t]$$

wherein $P_O$ = initial pressure, and
$P_t$ = total pressure at any time.

Activity Of Different Metal Oxide Catalysts

A variety of different powdered metal oxide catalysts were prepared as previously described herein. Some experiments utilized irradiation (photoenergy) while others were purposely maintained without irradiation (photoenergy). For this experimental series, the reaction temperature was maintained at 255° C. and the initial pressure of NO at 190 torr, uniformly. The results are summarized within Table II below.

TABLE 11

| CATALYSTS* | PRESSURE CHANGE ($\Delta P$, Torr) | RATE ($10^{-4}$ mole $hr^{-1}$ $cm^{-2}$) |
|---|---|---|
| $Fe_2O_3$ (Baker) | 48 | 0.107 |
| $Fe_2O_3$ (Fisher) | 34 | 0.076 |
| $TiO_2$ (DeGussa P25) | less than 1 | 0.00 |
| NiO (Green) | 5 | 0.011 |
| NiO (Black) | 5 | 0.011 |
| Dark Blank[t] | less than 1 | 0.00 |
| Illuminated Blank[o] | less than 1 | 0.00 |

*area was 38.5 cm$^2$ and 2 grams of catalyst was used.
[t]No catalyst and no irradiation.
[o]Irradiation but no catalyst.

Factors Affecting The Rate Of Catalytic Decomposition

A second series of experiments was conducted using both irradiation (photoenergy) and no illumination to identify which factors most influenced the catalytic rate under the described experimental conditions. Initially, the NO partial pressure was varied while maintaining a constant reaction temperature of 200° C. and every reaction mixture was irradiated. The results demonstrated a linear relationship between the logarithm of the partial pressure of NO and the time over at least three orders of magnitude of the partial pressure. A follow up series of experiments was then conducted with varying initial NO pressures in the range of from 100–250 torr and a reaction temperature which varied from 160°–360° C. These results are summarized by the data of Table III and FIG. 2 which distinguish between the effects of photoenergy and the absence of photoenergy over different reaction temperatures upon the reaction process. The empirical data obtained cumulatively demonstrate that the observed catalytic reaction is of the first order; and that the rate of catalytic reaction can be given by the slope of a lnP-t linear plot. However, as a heterogeneously catalyzed reaction, the slope of the line was also found to be affected by the actual physical dimensions of the reactor flask and the coated area of dispersed catalyst within the reaction chamber.

Influence Of Reactor Dimensions And Catalyst Surface Area

Experiments were conducted in which only the ratio of reactor volume to irradiated catalyst (coated area) were varied. These experiments maintained the reaction temperature at 200° C. with approximately the same initial NO pressures as in previously described experiments. The results are given by Table IV.

TABLE III

| INITIAL NO PRESSURE (Torr) | TEMPERATURE (°C.) | NO RATE CONSTANT [($10^{-4}$ cmsec$^{-1}$)] in Presence of photoenergy] | NO RATE CONSTANT [($10^{-4}$ cmsec$^{-1}$)] in Absence of photoenergy] |
|---|---|---|---|
| 162 | 25 | 0.09 | 0.00 |
| 202 | 203 | 1.34 | 0.33 |
| 420 | 203 | 1.36 | N/A |
| 735 | 203 | 1.50 | N/A |
| 327 | 256 | 6.08 | 1.40 |
| 156 | 260 | 5.87 | 1.50 |
| 190 | 310 | 4.00 | N/A |
| 197 | 310 | 3.69 | N/A |
| 217 | 310 | 3.69 | 2.39 |
| 217 | 361 | 3.21 | N/A |

N/A = not available

It was observed that the larger the catalytic surface to reaction volume ratio, the faster the resulting reaction. The rate constant (per unit illuminated surface area) is calculated by multiplying the slope of a $lnP_{NO}$-t graphic plot by the ratio of volume to area employed. This result is deemed important in the design of photoreactors for specific reaction conditions and particular use environments.

TABLE IV

| REACTOR VOLUME (cm$^3$) | CATALYST AREA (cm$^2$) | $lnP_{NO}{-}^t$ SLOPE (sec$^{-1}$) | $K_1$ = SLOPE · (V/A) (cmsec$^{-1}$) |
|---|---|---|---|
| 260 | 38.5 | $1.99 \times 10^{-5}$ | $1.34 \times 10^{-4}$ |
| 130 | 19.6 | $1.32 \times 10^{-5}$ | $0.88 \times 10^{-4}$ |
| 85 | 37.4 | $4.94 \times 10^{-5}$ | $1.12 \times 10^{-4}$ |

Alternative Radiation Sources

For purposes of the present invention any radiation source able to provide photoenergy at a desired wavelength is acceptable for use. For most experiments, the quartz-halogen lamp was preferred However, two other sources of illumination were also appraised. The essential differences observed among these is summarized below.

Reactions With A Xenon Lamp As The Radiation Source

A series of comparative reactions were performed as described previously in which all parameters were identical except a 150 watt Xenon lamp was used in place of the 150 watt quartz-halogen lamp. The rate constant was determined to be $2.55 \times 10^{-4}$ cmsec$^{-1}$ at 26° C. This is about 40% of that rate constant obtained using the quartz-halogen lamp at the same temperature ($5.87 \times 10^{-4}$ cmsec$^{-1}$). This difference was readily understood by a comparison of the emission spectra of the light source and the absorption spectrum of the $Fe_2O_3$ catalyst employed.

Reactions With Heated $ThO_2$ As The Radiation Source

A series of comparative reactions were also performed using heated thorium oxide ($ThO_2$) as the radiation source. These experiments were conducted at 255° C. using a propane-$ThO_2$ lamp. The illuminated reaction rate constant was calculated to be $2.59 \times 10^{-4}$ cmsec$^{-1}$—a constant very similar to that obser the 150 W xenon lamp. Photoefficiencies of the different radiation sources were not measured. However, it is unequivocally clear that radiation from the incandescent metal oxide induced a substantial amount of reaction.

Temperature Effects

Another experimental series was performed to evaluate the effect of different temperatures on the catalytic reaction and the differences, if any, between irradiation and an avoidance of photoenergy upon the reaction mixture at the different temperatures employed. Accordingly, identical reaction mixtures were evaluated at temperatures ranging between 25°–310° C. and in the presence and in the absence of photoenergy. The results are as given by Table III and FIG. 2 previously.

Figure 2:
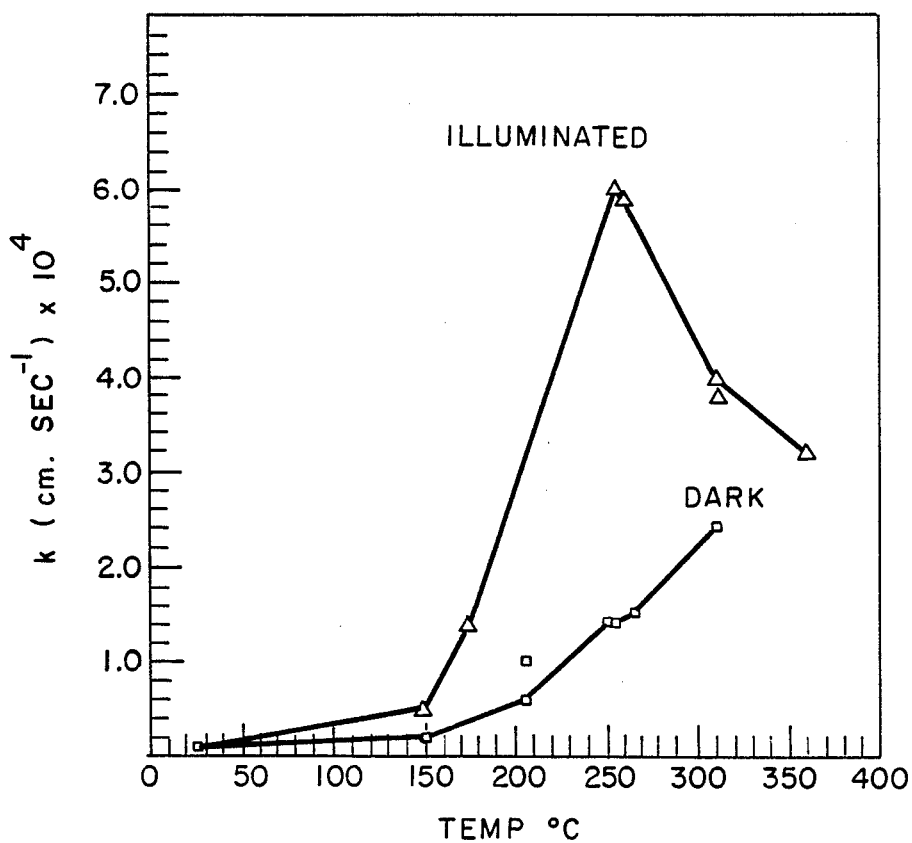
FIG. 2 is a graph illustrating the photodecomposition effects of increasing reaction temperature upon the $Fe_2O_3$ catalyst employed in accordance with the method of the present invention.

The graph of FIG. 2 graphically demonstrates the results of temperature and irradiation upon the catalytic reaction mixtures. Clearly, there is a negligible reaction and catalysis at 25° C. which increases in the absence of radiation (photoenergy) as the temperature is increased up to 310° C. In comparison, while the irradiated reaction mixture is similarly negligible in result at room temperature, there is a parabolic reaction effect as the temperature is increased. Clearly, there is a rapid rise in catalysis rate as the reaction temperature is increased beyond 200° C. which reaches a maximum rate at approximately 255° C. Additional increases in temperature then cause a corresponding decrease in reaction rate at temperatures from 255°–310° C. The reaction rate is higher in the presence of photoenergy than in its absence over the range from 150°–310° C. At about 255° C. the irradiated reaction mixture reacts more than four times as fast as the corresponding reaction mixture maintained in the absence of photoenergy. The irradiated reaction constant and the non-irradiated (dark) reaction constant are $6.08 \times 10^{-4}$ cmsec$^{-1}$ and $1.38 \times 10^{-4}$ cmsec$^{-1}$ respectively.

The Influence Of Radiation Intensity

An experimental series was conducted using an 85 ml photoreactor capacity held at 200° C. for purposes of evaluating the influence of varying radiation intensity upon the catalytic reaction mixtures. To achieve the experimental variation, the 150 watt quartz-halogen lamp was employed alternatively at full intensity; or in combination with neutral density filters of optical density 0.3, 1.0, 2.@, and 3.0 —each of which diminished the radiation intensity by 50%, 90%, 99%, and 99.9% respectively. At each intensity of irradiation, decomposition of nitric oxide (NO) corresponded to first order behavior —that is, log $P_{NO}$ decreased linearly with time.

Figure 3:
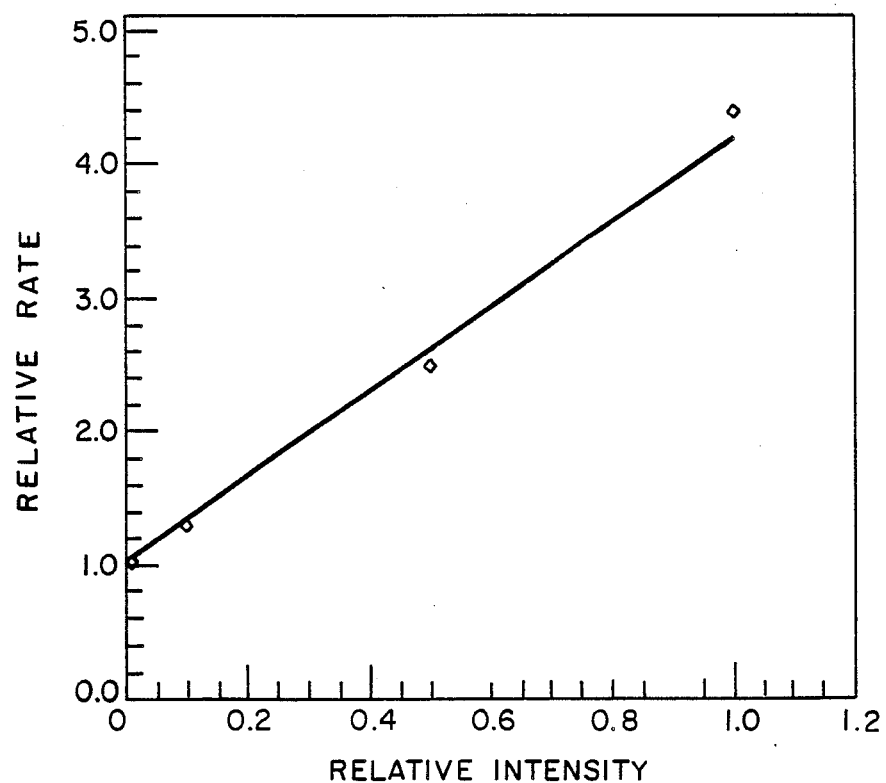
FIG. 3 is a graph illustrating the photodecomposition effect of radiation intensity upon the $Fe_2O_3$ catalyst when using the method of the present invention.

The graph of FIG. 3 represents the photodecomposition of NO using a $Fe_2O_3$ catalyst at a temperature of 255° C. FIG. 3 thus provides the rates of the reaction under different relative intensities of radiation relative to the dark rate and reveals a roughly linear relationship between rate constant and irradiation intensity. It is clear, therefore, that the greater the irradiation intensity, the greater the rate constant and overall speed of NO photodecomposition.

The present invention is not to be restricted in form nor limited in scope except by the claims appended hereto.

What we claim is:

1. A photopromoted method for decomposing oxides of nitrogen into environmentally compatible products, said method comprising the steps of:
   obtaining at least one solid metal oxide catalyst capable of absorbing photoenergy at a predeterminable wavelength;
   introducing a gaseous stream comprising at least one oxide of nitrogen to said solid metal oxide catalyst to form a reaction mixture;
   heating said reaction mixture to an elevated temperature between about 100°–700° C.; and
   adding photoenergy at a wavelength absorbable by said heated solid metal oxide catalyst of said heated reaction mixture wherein the absorption of said photoenergy causes said heated metal oxide catalyst to enter into an activated catalytic state and said oxide of nitrogen is decomposed by said activated catalytic state into molecules of nitrogen and oxygen.

2. A photopromoted method for decomposing oxides of nitrogen into environmentally compatible products, said method comprising the steps of:
   obtaining at least one solid metal oxide catalyst capable of absorbing photoenergy at a predeterminable wavelength;
   introducing a gaseous stream comprising at least one oxide of nitrogen compound having the formula:

$NO_x$ wherein x is a positive number to said solid metal oxide catalyst to form a reaction mixture;
   heating said reaction mixture to an elevated temperature between about 100°–700° C.; and
   adding photoenergy at a wavelength absorbable by said heated solid metal oxide catalyst of said heated reaction mixture wherein the absorption of said photoenergy causes said heated metal oxide catalyst to enter into an activated catalytic state and said $NO_x$ compound is decomposed by said activated catalytic state into molecules of nitrogen and oxygen.

3. A photopromoted method for decomposing nitric oxide into environmentally compatible products, said method comprising the steps of:

obtaining at least one solid metal oxide catalyst capable of absorbing photoenergY at a predeterminable wavelength;

introducing a gaseous stream comprising at least nitric oxide to said solid metal oxide catalyst to form a reaction mixture;

heating said reaction mixture to an elevated temperature between about 100°–700° C.; and adding photoenergy at a wavelength absorbable by said heated solid metal oxide catalyst of said heated reaction mixture wherein the absorption of said photoenergy causes said heated metal oxide catalyst to enter into an activated catalytic state and said nitric oxide is decomposed by said activated catalytic state into molecules of nitrogen and oxygen.

4. The photopromoted method as recited in claim 1, 2, or 3 wherein said reaction mixture further comprises at least one substance selected from the group consisting of water vapor, dinitrogen, dioxygen, methane, carbon monoxide, carbon dioxide, unburned hydrocarbons, partially oxidized hydrocarbons, soot, and particulate matter.

5. The photopromoted method as recited in claim 1, 2, or 3 wherein said elevated temperature of said heated reaction mixture is between about 200°–400° C.

6. The photopromoted method as recited in claim 5 wherein said elevated temperature is between about 225°–275° C.

7. The photopromoted method as recited in claim 1, 2, or 3 wherein said method is performed at ambient environmental total pressure.

8. The photopromoted method as recited in claim 1, 2, or 3 wherein said solid metal oxide catalyst comprises iron.

9. The photopromoted method as recited in claim 1, 2, or 3 wherein said solid metal oxide catalyst comprises nickel.

10. The photopromoted method as recited in claim 1, 2, or 3 wherein said solid metal oxide catalyst comprises a particulate powder.

11. The photopromoted method as recited in claim 1, 2, or 3 wherein said photoenergy is supplied by a lamp.

12. The photopromoted method as recited in claim 11 wherein said lamp is a metal oxide heated to incandescence.

* * * * *